(12) United States Patent
Funaki et al.

(10) Patent No.: US 9,145,074 B2
(45) Date of Patent: Sep. 29, 2015

(54) SEAT COMPONENT POSITIONING STRUCTURE

(71) Applicant: TOYOTA BOSHOKU KABUSHIKI KAISHA, Aichi-ken (JP)

(72) Inventors: Shohei Funaki, Aichi-ken (JP); Michiaki Kojima, Aichi-ken (JP)

(73) Assignee: TOYOTA BOSHOKU KABUSHIKI KAISHA, Aichi-Ken (JP)

(*) Notice: Subject to any disclaimer, the term of this patent is extended or adjusted under 35 U.S.C. 154(b) by 0 days.

(21) Appl. No.: 14/528,269

(22) Filed: Oct. 30, 2014

(65) Prior Publication Data

US 2015/0115687 A1    Apr. 30, 2015

(30) Foreign Application Priority Data

Oct. 31, 2013  (JP) ................. 2013-226866

(51) Int. Cl.
*B60N 2/44* (2006.01)
(52) U.S. Cl.
CPC ..................... *B60N 2/442* (2013.01)
(58) Field of Classification Search
CPC ....................................... B60N 2/442
USPC ......................... 296/65.09, 193.07
See application file for complete search history.

(56) References Cited

U.S. PATENT DOCUMENTS 7,419,218 B2 *  9/2008  Holdampf et al. ....... 297/378.12

FOREIGN PATENT DOCUMENTS

JP       2007091093      4/2007

* cited by examiner

*Primary Examiner* — Pinel Romain
(74) *Attorney, Agent, or Firm* — Greenblum & Bernstein, P.L.C.

(57) ABSTRACT

A seat component positioning structure includes a component of a conveyance seat; a floor having a positioning hole; and a locate pin provided in the component. The component is positioned by inserting the locate pin through the positioning hole in the floor. The locate pin includes a distal-side large diameter portion, a base-side large diameter portion, and a small diameter portion disposed between the distal-side large diameter portion and the base-side large diameter portion. When the component is fixed to the floor, a portion of the base-side large diameter portion faces a peripheral surface around the positioning hole in the floor. A resin layer is provided on a surface of the portion of the base-side large diameter portion, the portion facing the peripheral surface around the positioning hole in the floor when the component is fixed to the floor.

3 Claims, 5 Drawing Sheets

SEAT COMPONENT POSITIONING STRUCTURE

INCORPORATION BY REFERENCE

The disclosure of Japanese Patent Application No. 2013-226866 filed on Oct. 31, 2013 including the specification, drawings and abstract is incorporated herein by reference in its entirety.

BACKGROUND OF THE INVENTION

1. Field of the Invention

The invention relates to a seat component positioning structure for a seat provided in a conveyance such as a vehicle, an airplane, a ship, or a train.

2. Description of Related Art

When a seat, a seat back, or the like is fixed to a floor of a vehicle body, first, the seat, the seat back, or the like is temporarily installed on the floor in a state in which bolt insertion holes, which are provided in a pair of seat legs or a pair of seat back lower frames that supports the seat, the seat back, or the like, are aligned with corresponding bolt holes in the floor. Next, in a state in which the seat, the seat back, or the like is temporarily installed, bolts are screwed into the bolt holes in the floor via the bolt insertion holes. Thus, the seat legs or the seat back lower frames are fixed to the floor. In most cases, the weights of front and rear portions of the seat or the seat back are not well-balanced. Therefore, when the seat or the seat back is temporarily installed, it is difficult for the seat or the seat back to maintain an appropriate posture by itself. Accordingly, an operator needs to perform an operation of fixing the seat or the seat back while supporting the seat or the seat back with his or her hand. This inevitably leads to a decrease in workability. In view of the above, in a technology described in Japanese Patent Application Publication No. 2007-91093, a locate pin having a rib portion is provided in each of a pair of seat legs, and the locate pin is inserted through a positioning hole in a floor. After the locate pin is inserted through the positioning hole in the floor, the rib portion of the locate pin engages with a peripheral edge around the positioning hole in the floor, and thus, a seat is easily maintained in an appropriate posture.

In the technology described in Japanese Patent Application Publication No. 2007-91093, the seat legs or the seat back lower frames can be fitted to the floor with high workability. However, when the seat is vibrated, for example, during traveling of a vehicle after the seat legs or the seat back lower frames are fixed by screwing bolts, the side surface of each locate pin may contact the surface of the peripheral edge around the corresponding positioning hole in the floor, and thus, noise may be caused.

SUMMARY OF THE INVENTION

In view of the above, the invention provides a seat component positioning structure that makes it possible to fit a seat leg or a seat back lower frame to a floor with high workability, and to suppress occurrence of noise due to, for example, vibrations after the seat leg or the seat back lower frame is fitted to the floor.

An aspect of the invention relates to a seat component positioning structure including a component of a conveyance seat; a floor having a positioning hole; and a locate pin provided in the component, wherein the component is positioned by inserting the locate pin through the positioning hole in the floor; the locate pin includes a distal-side large diameter portion, a base-side large diameter portion, and a small diameter portion disposed between the distal-side large diameter portion and the base-side large diameter portion; when the component is fixed to the floor, a portion of the base-side large diameter portion faces a peripheral surface around the positioning hole in the floor; and a resin layer is provided on a surface of the portion of the base-side large diameter portion, the portion facing the peripheral surface around the positioning hole in the floor when the component is fixed to the floor. According to the first aspect of the invention, in a case where the component of the conveyance seat is fixed to the floor, when the component is positioned by inserting the locate pin provided in the component through the positioning hole in the floor, the small diameter portion of the locate pin engages with the peripheral edge around the positioning hole in the floor. Thus, the component is easily maintained in an appropriate posture, and it is possible to avoid a decrease in workability. Further, the resin layer is provided on the surface of the portion of the base-side large diameter portion of the locate pin, the portion facing the floor when the component is fixed to the floor by screwing a bolt into the floor. Therefore, it is possible to avoid a situation in which the metal portion of the locate pin and the metal of the floor contact each other. Thus, it is possible to suppress occurrence of noise.

In the above-described aspect, the resin layer may be a resin ring with a C-shaped cross-section, and the resin ring may be fitted to an annular groove that is provided by reducing a diameter of the portion of the base-side large diameter portion. With the configuration, it is possible to prevent occurrence of noise by employing a simple method in which the resin ring with the C-shaped cross-section is fitted to the groove provided on a circumference of the portion of the base-side large diameter portion of the locate pin.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

FIGS. 1 to 6 illustrate an embodiment of the invention. The embodiment indicates an example in which the invention is applied to a seat back frame for a vehicle (hereinafter referred to as "back frame"). In each drawing, arrows indicate directions with respect to the conveyance when the back frame is fitted to a floor. Hereinafter, descriptions regarding directions will be provided based on the directions indicated by the arrows in each drawing.

Figure 1:
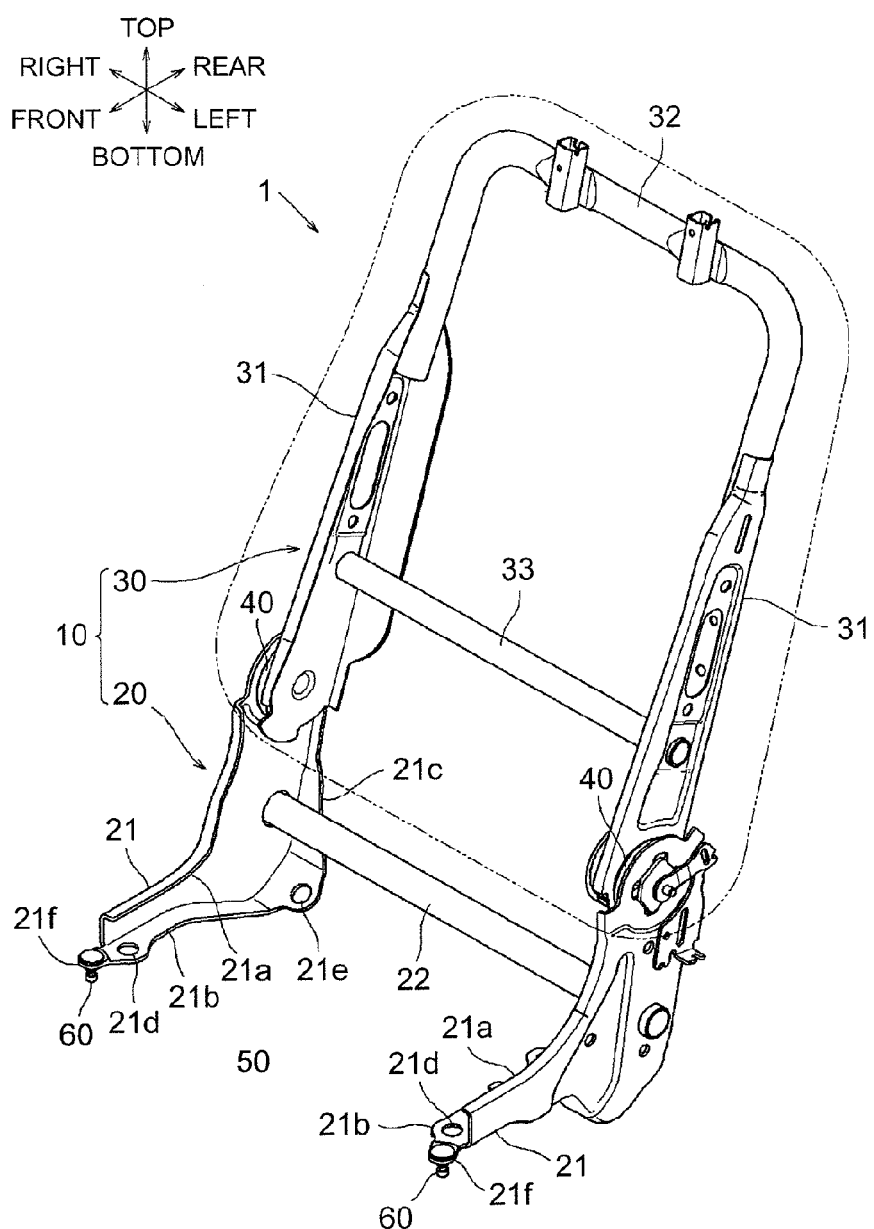
FIG. 1 is a perspective view illustrating a seat back to which an embodiment of the invention is applied.

As shown in FIG. 1, a back frame 10, to which a seat component positioning structure according to the embodiment is applied, includes a lower-side frame 20 and an upper-side frame 30. The lower-side frame 20 includes a pair of lower frames 21 and a lower pipe 22 that is a pipe member and that connects the lower frames 21. The lower frames 21 may be regarded as a "component" according to the invention. The upper-side frame 30 includes a pair of side frames 31, an upper frame 32, and a connecting pipe 33. The side frames 31 are plate members respectively disposed on right and left sides to extend in a top-bottom direction. Ribs (protruding walls) that extend toward an inside of the back frame 10 are respectively provided at a front end portion and a rear end portion of each side frame 31. The upper frame 32 is a member formed by bending a pipe with a circular cross-section into a substantially U-shape. The upper frame 32 is provided to connect upper end portions of the side frames 31. The connecting pipe 33 is a pipe member with a circular cross-section, and connects portions of the side frames 31, the portions being located near middle portions of the side frames 31. Upper end portions of the lower frames 21 are fitted to lower end portions of the side frames 31 via recliners 40, respectively. By operating the recliners 40, a relative angle of the upper-side frame 30 with respect to the lower-side frame 20 in a front-rear direction can be adjusted. In the back frame 10, the upper-side frame 30 is covered with a seat cover material, such as fabric, in a manner such that a cushion material is provided between the upper-side frame 30 and the seat cover material. Thus, the back frame 10 forms a seat back 1, and accordingly, the back frame 10 supports a seated occupant together with a seat cushion (not shown).

Figure 2:
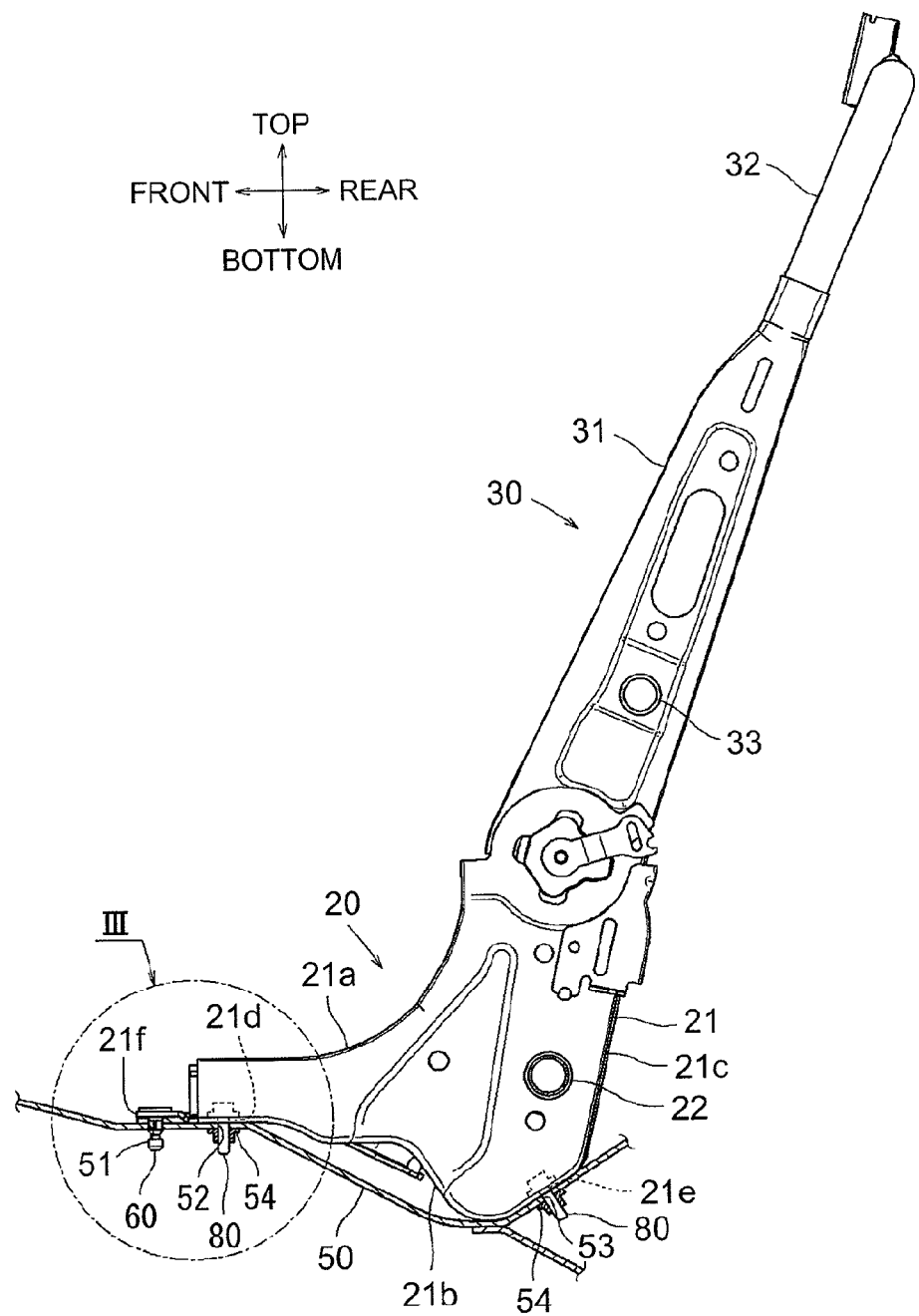
FIG. 2 is a side view illustrating a seat back frame to which the embodiment of the invention is applied.
Figure 3A:
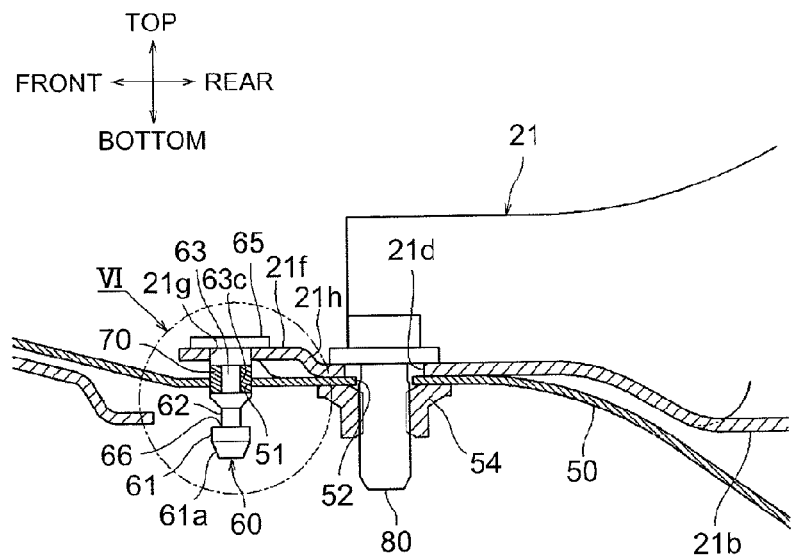
FIGS. 3A and 3B are views each illustrating an enlarged portion III in FIG. 2, FIG. 3A illustrating a state in which a lower frame is fixed to a floor by screwing a bolt, and FIG. 3B illustrating a state in which a small diameter portion of a locate pin engages with a peripheral edge around a positioning hole in the floor.

As shown in FIG. 1 and FIG. 2, each lower frame 21 is a plate member that has an inverted L-shape in a side view. Ribs (protruding walls) that extend toward the inside of the back frame 10 are provided at end portions of the lower frame 21 excluding a front end portion and an upper end portion. The width of a lower rib 21b is larger than the width of an upper rib 21a and the width of a rear rib 21c. The lower rib 21b has a front bolt hole 21d and a rear bolt hole 21e through which bolts are inserted to fasten the lower frame 21 to a floor 50. Further, an extended portion 21f is provided at a front end portion of the lower rib 21b. As shown in FIG. 3A, the extended portion 21f has a locate pin fitting hole 21g through which a locate pin 60 is fitted. The extended portion 21f has an upper surface disposed at a position raised in an upward direction with respect to an upper surface of the lower rib 21b, in which the front bolt hole 21d is provided (in other words, the extended portion 21f has the upper surface disposed at a higher position than the position of the upper surface of the lower rib 21b, in which the front bolt hole 21d is provided) such that a tilted surface portion 21h is disposed between the upper surface of the extended portion 21f and the upper surface of the lower rib 21b, in which the front bolt hole 21d is provided. As described later, the height from upper surface of the lower rib 21b, in which the front bolt hole 21d is provided, to the upper surface of the extended portion 21f is set so that a groove portion 63c provided in a base-side large diameter portion 63 is located at a position corresponding to a peripheral edge (peripheral surface) around a locate pin insertion hole 51 in the floor 50 (i.e., the groove portion 63c faces the peripheral edge (peripheral surface) around the locate pin insertion hole 51) when the lower frame 21 is fixed to the floor 50 using the bolts in a state in which the locate pin 60 is fitted to the lower frame 21 and is inserted through the locate pin insertion hole 51 in the floor 50. The floor 50 has the locate pin insertion hole 51 provided at a position that corresponds to the locate pin 60 when the back frame 10 is fitted to the floor 50. Further, the floor 50 has a front nut hole 52 provided at a position that corresponds to the front bolt hole 21d when the back frame 10 is fitted to the floor 50, and a rear nut hole 53 provided at a position that corresponds to the rear bolt hole 21e when the back frame 10 is fitted to the floor 50. The locate pin insertion hole 51 may be regarded as a "positioning hole" according to the invention. Stud nuts 54 are fitted to a lower surface of the floor 50 such that the stud nuts 54 are coaxial with the front nut hole 52 and the rear nut hole 53, respectively.

Figure 4A:
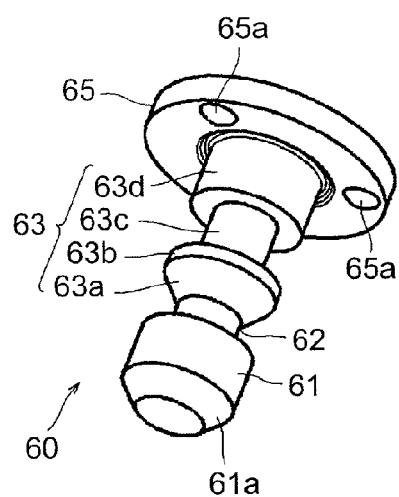
FIGS. 4A and 4B are perspective views each illustrating the locate pin, FIG. 4A illustrating the locate pin in a state in which a resin ring with a C-shaped cross-section is not fitted, and FIG. 4B illustrating the locate pin in a state in which the resin ring with the C-shaped cross-section is fitted.
Figure 4B:
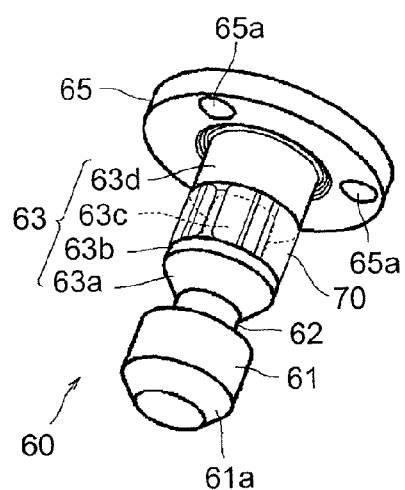

As shown in FIG. 4A, the locate pin 60 includes a main body portion with a cylindrical shape, and a flange portion 65 provided at the main body portion. The locate pin 60 is made of iron, and formed by quenching. The cylindrical main body portion includes a distal-side large diameter portion 61 provided with a chamfered portion 61a, a small diameter portion 62, and the base-side large diameter portion 63 that are arranged in this order from a distal end. The base-side large diameter portion 63 includes a tilted portion 63a, a first large diameter portion 63b, the groove portion 63c, and a second large diameter portion 63d that are arranged in this order from a side close to the distal end. The diameter of the distal-side large diameter portion 61, and the diameters of the first large diameter portion 63b and the second large diameter portion 63d of the base-side large diameter portion 63 are the same, and are slightly smaller than the diameter of the locate pin insertion hole 51 provided in the floor 50. The diameter of the small diameter portion 62 and the diameter of a bottom face portion of the groove portion 63c of the base-side large diameter portion 63 are the same. Each of the diameter of the small diameter portion 62 and the diameter of the bottom face portion of the groove portion 63c is approximately a half of the outer diameter of the cylindrical main body portion. A corner portion 66 is provided between the distal-side large diameter portion 61 and the small diameter portion 62. The flange portion 65 has a disc shape, and has a diameter that is approximately twice the outer diameter of the cylindrical main body portion. In a main body-side surface of the flange portion 65, which faces the cylindrical main body portion, three projections 65a for projection welding are provided at equal intervals.

Figure 5:
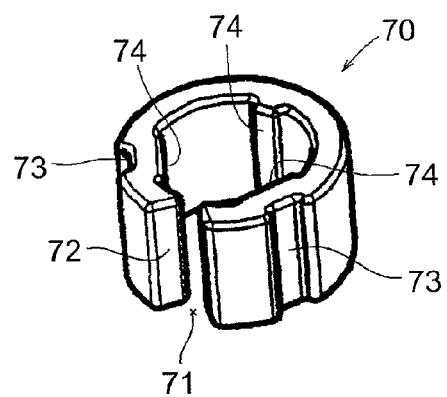
FIG. 5 is a perspective view illustrating the resin ring with the C-shaped cross-section.

As shown in FIG. 5, a resin ring 70 with a C-shaped cross-section is a resin component made of polyoxymethylene (POM). A slit 71 is provided at a part of the cylinder of the resin ring 70, and the slit 71 extends along the axis of the cylinder. The cross-sectional shape of the resin ring 70 in a direction orthogonal to the axis of the cylinder is a C-shape. Three protruding portions 74 are provided on an inner side of the cylinder of the resin ring 70 at three locations arranged at equal angular intervals around the center of the cylinder. The three protruding portions 74 extend along the axis of the cylinder. Groove portions 73 are provided at locations on a side opposite to the two protruding portions 74 between which the slit 71 is provided, that is, on the outer side of the cylinder. The groove portions 73 extend along the axis of the cylinder. The width of the outer side of the slit 71 is set to be larger than the width of the inner side of the slit 71. The groove portions 73 are provided, and the width of the outer side of the slit 71 is set to be larger than the width of the inner side of the slit 71 so that the slit 71 of the resin ring 70 with the C-shaped cross-section is easily expanded when the slit 71 is pressed to the bottom face portion of the groove portion 63c of the locate pin 60 and then the resin ring 70 is fitted to the groove portion 63c. The resin ring 70 with the C-shaped cross-section has such a size as to be fitted to the groove portion 63c of the locate pin 60. That is, the height of the cylinder of the resin ring 70 with the C-shaped cross-section is slightly smaller than the width of the groove portion 63c of the locate pin 60, and the diameter of a circle in contact with the distal ends of the protruding portions 74 of the resin ring 70 with the C-shaped cross-section is slightly smaller than the diameter of the bottom face portion of the groove portion 63c of the locate pin 60. The resin ring 70 with the C-shaped cross-section may be regarded as a "resin layer" according to the invention.

A method of assembling the back frame 10 will be described. As shown in FIG. 1, the lower-side frame 20 and the upper-side frame 30 are fitted to each other via the recliners 40 by, for example, welding. In this case, as shown in FIG. 3A, the cylindrical main body portion of the locate pin 60 is inserted through the locate pin fitting hole 21g of each lower frame 21, and the projections 65a of the flange portion 65 are caused to contact the surface of the extended portion 21f of the lower frame 21. In this state, projection welding is performed. Next, the slit 71 of the resin ring 70 with the C-shaped cross-section is pressed to the groove portion 63c of the locate pin 60, and then, the resin ring 70 is fitted to the groove portion 63c. In the back frame 10, the upper-side frame 30 is covered with the seat cover material, such as fabric, in a manner such that the cushion material is provided between the upper-side frame 30 and the seat cover material. Thus, the back frame 10 forms the seat back 1.

Figure 3B:
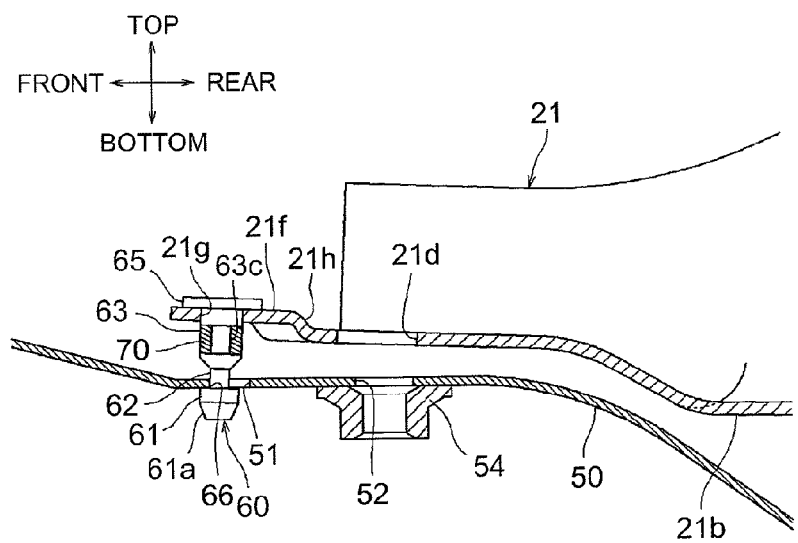

The advantageous effects obtained by the above-described configuration in the embodiment, and the method of installing the seat back 1 on the floor will be described. The locate pin 60 of each of the pair of lower frames 21 of the seat back 1 is inserted through the locate pin insertion hole 51 in the floor 50. At this time, even if the center axis of the locate pin 60 is slightly deviated from the center of the locate pin insertion hole 51, the position of the locate pin 60 is automatically adjusted and thus, the locate pin 60 can be inserted, because the chamfered portion 61a is provided in the distal-side large diameter portion of the locate pin 60. Even if an operator takes his or her hand off the seat back 1 in a state in which the locate pins 60 are inserted through the locate pin insertion holes 51, the seat back 1 does not fall and is maintained in an appropriate state, because the corner portion 66 formed by the distal-side large diameter portion 61 and the small diameter portion 62 of each locate pin 60 engages with the peripheral edge portion around the corresponding locate pin insertion hole 51 in the floor 50 as shown in FIG. 3B. Thus, it is possible to improve workability in installing the seat back 1 on the floor 50.

Figure 6:
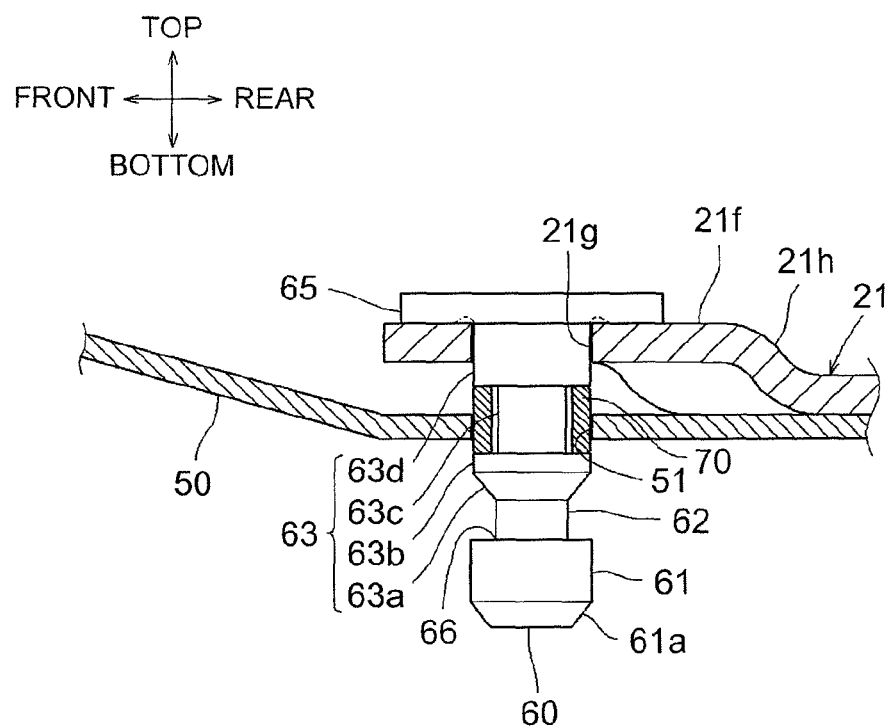
FIG. 6 is a view illustrating an enlarged portion VI in FIG. 3A.

Next, as shown in FIG. 2 and FIG. 3A, the front bolt hole 21d and the rear bolt hole 21e of each lower frame 21 are respectively aligned with the front nut hole 52 and the rear nut hole 53 of the floor 50, and then, each lower frame 21 is fixed to the floor 50 using bolts 80. At this time, as shown in FIG. 3A and FIG. 6, in the base-side large diameter portion 63 of the locate pin 60, the portion, in which the resin ring 70 with the C-shaped cross-section is fitted, is located at the position corresponding to the peripheral edge (peripheral surface) around the locate pin insertion hole 51 in the floor 50 (i.e., the portion of the base-side large diameter portion 63 faces the peripheral edge (peripheral surface) around the locate pin insertion hole 51). Thus, when the floor 50 is vibrated by, for example, vibrations caused during traveling of a vehicle, the metal of the floor 50 does not contact the metal portions of the locate pins 60. Accordingly, it is possible to suppress occurrence of noise. Further, the resin ring 70 with the C-shaped cross-section can be easily fitted in the process of assembling the back frame 10. Thus, the resin layer is efficiently provided.

Although the specific embodiment has been described, the invention is not limited to the appearance and the configuration in the embodiment, and various modifications, addition, and deletion may be made without departing from the scope of the invention. For example, in the above-described embodiment, the resin ring 70 with the C-shaped cross-section is employed as the resin layer in the locate pin 60. However, the resin layer may be provided by applying resin coating using a dipping method. In the above-described embodiment, polyoxymethylene (POM) is employed as the material for the resin ring 70 with the C-shaped cross-section. However, the material for the resin ring 70 is not limited to POM, and thermoplastic resins, such as polyamide, polypropylene, and polyethylene, may be used. In the above-described embodiment, the invention is applied when the seat back 1 is fixed to the floor 50. However, the invention may be applied, for example, when seat legs of a seat are installed in a case where the seat cushion is integrated with the seat back in the seat. In the above-described embodiment, the invention is applied to a vehicle seat. However, the invention may be applied to a seat provided in, for example, an air plane, a ship, or a train.

What is claimed is:

1. A seat component positioning structure comprising:
   a component of a conveyance seat;
   a floor having a positioning hole; and
   a locate pin provided in the component, wherein:
   the component is positioned by inserting the locate pin through the positioning hole in the floor;
   the locate pin includes a distal-side large diameter portion, a base-side large diameter portion, and a small diameter portion disposed between the distal-side large diameter portion and the base-side large diameter portion;
   when the component is fixed to the floor, a portion of the base-side large diameter portion faces a peripheral surface around the positioning hole in the floor; and
   a resin layer is provided on a surface of the portion of the base-side large diameter portion, the portion facing the peripheral surface around the positioning hole in the floor when the component is fixed to the floor.

2. The seat component positioning structure according to claim 1, wherein the resin layer is a resin ring with a C-shaped cross-section, and the resin ring is fitted to an annular groove that is provided by reducing a diameter of the portion of the base-side large diameter portion.

3. The seat component positioning structure according to claim 1, wherein when the component is positioned by inserting the locate pin through the positioning hole in the floor, a corner portion formed by the small diameter portion and the distal-side large diameter portion engages with a peripheral edge portion around the positioning hole in the floor.

* * * * *